(12) United States Patent
Desai et al.

(10) Patent No.: US 11,799,876 B2
(45) Date of Patent: Oct. 24, 2023

(54) WEB CRAWLER SYSTEMS AND METHODS TO EFFICIENTLY DETECT MALICIOUS SITES

(71) Applicant: Zscaler, Inc., San Jose, CA (US)

(72) Inventors: Deepen Desai, San Ramon, CA (US); Dhruval Gandhi, Bengaluru (IN); Sachin Matte, Bengaluru (IN)

(73) Assignee: Zscaler, Inc., San Jose, CA (US)

( * ) Notice: Subject to any disclaimer, the term of this patent is extended or adjusted under 35 U.S.C. 154(b) by 248 days.

(21) Appl. No.: 16/686,294

(22) Filed: Nov. 18, 2019

(65) Prior Publication Data
US 2021/0105289 A1    Apr. 8, 2021

(30) Foreign Application Priority Data
Oct. 4, 2019    (IN) .............................. 201911040370

(51) Int. Cl.
*H04L 9/40*    (2022.01)
*G06F 16/958*    (2019.01)

(52) U.S. Cl.
CPC ........ *H04L 63/1416* (2013.01); *G06F 16/986* (2019.01); *H04L 63/0272* (2013.01); *H04L 63/101* (2013.01)

(58) Field of Classification Search
CPC ............. H04L 63/1416; H04L 63/0272; H04L 63/101; H04L 63/0227; G06F 16/986; G06F 21/566; G06F 21/554; G06F 16/951

See application file for complete search history.

(56) References Cited

U.S. PATENT DOCUMENTS

| | | | | |
|---|---|---|---|---|
| 7,854,001 | B1 * | 12/2010 | Chen | H04L 41/00 726/22 |
| 9,264,399 | B1 * | 2/2016 | Schryver | H04L 63/101 |
| 9,690,936 | B1 * | 6/2017 | Malik | G06F 21/566 |
| 9,882,767 | B1 | 1/2018 | Foxhoven et al. | |
| 10,142,362 | B2 | 11/2018 | Weith et al. | |
| 10,148,681 | B2 * | 12/2018 | Banerjee | H04L 63/1441 |

(Continued)

OTHER PUBLICATIONS

Li et al. "Hunting the Red Fox Online: Understanding and Detection of Mass Redirect-Script Injections", 2014 IEEE Symposium on Security and Privacy, pp. 1-18. (Year: 2014).*

(Continued)

*Primary Examiner* — Daniel B Potratz
(74) *Attorney, Agent, or Firm* — Baratta Law PLLC; Lawrence A. Baratta, Jr.; Ryan Odessa (57) ABSTRACT

Systems and methods include receiving a list of web sites; anonymously browsing to each web site in the list; receiving a response based on the browsing; and analyzing the response to classify each web site as malicious or not based on a plurality of techniques including JavaScript (JS) obfuscation detection based on de-obfuscation. The systems and methods can further include providing a blacklist of web sites classified as malicious. The systems and methods can further include determining the list of web sites periodically based on a plurality of factors. The JS obfuscation detection can be performed by de-obfuscating JS content and utilizing heuristics to determine if the de-obfuscated JS content is malicious, and the heuristics can include a presence of any of a new JS function and a domain in the de-obfuscated JS content.

14 Claims, 5 Drawing Sheets

(56) References Cited

U.S. PATENT DOCUMENTS

| | | | |
|---|---|---|---|
| 2010/0313271 A1* | 12/2010 | Johnson | G06F 21/56 |
| | | | 726/24 |
| 2012/0174224 A1* | 7/2012 | Thomas | G06F 21/566 |
| | | | 726/24 |
| 2013/0117459 A1* | 5/2013 | Haynes | H04L 63/20 |
| | | | 709/228 |
| 2013/0219281 A1* | 8/2013 | Trevelyan | G06F 16/951 |
| | | | 715/738 |
| 2016/0065613 A1* | 3/2016 | Cho | H04L 63/1416 |
| | | | 726/23 |
| 2017/0005805 A1* | 1/2017 | Wang | G06F 21/00 |
| 2017/0310709 A1 | 10/2017 | Foxhoven et al. | |
| 2017/0359220 A1 | 12/2017 | Weith et al. | |
| 2018/0139235 A1 | 5/2018 | Desai et al. | |
| 2018/0293381 A1 | 10/2018 | Tseng et al. | |
| 2019/0132355 A1* | 5/2019 | Egbert | G06F 21/566 |
| 2019/0281073 A1 | 9/2019 | Weith et al. | |
| 2020/0372085 A1* | 11/2020 | Takata | G06F 16/951 |

OTHER PUBLICATIONS

Canali, D. et al., "Prophiler: A Fast Filter for the Large-Scale Detection of Malicious Web Pages", 2011, International World Wide Web Conference Committee (IW3C2) (Year: 2011).*

* cited by examiner

WEB CRAWLER SYSTEMS AND METHODS TO EFFICIENTLY DETECT MALICIOUS SITES

FIELD OF THE DISCLOSURE

The present disclosure relates generally to network security. More particularly, the present disclosure relates to web crawler systems and methods to efficiently detect malicious sites.

BACKGROUND OF THE DISCLOSURE

Web sites are a great source of information and web technology continues to rapidly increase. This is the reason why the web has a large user base. This also makes websites an easy target for an attacker to spread a malicious attack leading to mass infection. It has been observed that most attacks start from a compromised website. Catching these threats in the early stages is critical and various techniques have been developed for detection including web crawlers. A web crawler (also sometimes referred to as a spider, bot, crawler, etc.) is a system that systematically browses the web for some purpose. Web crawlers are used for search engines for identifying and indexing sites. For network security systems, web crawlers are used for identifying and categorizing malicious sites. Once a malicious site is detected, the site can be blocked, quarantined, blacklisted, etc. As such, attackers adopt different anti-analysis techniques (countermeasures) to avoid a malicious categorization. Such techniques can easily bypass conventional crawling attempts thereby enabling malicious sites from avoiding detection. Examples of anti-analysis techniques include JavaScript (JS) obfuscation, victim's system reconnaissance, geo IP detection, etc. For example, victim's system reconnaissance is where malicious websites serve malware based on gathered information from a victim such as the victim's operating system, browser type and version, etc. For geo IP detection, malicious websites may also check the victim's Internet Protocol (IP) address and location too.

JS is used to enable interactive web pages and web applications. It is widely used, and most web browsers include JS engines for JS code execution. However, JS also can be used by attackers to deliver scripts to run on a user device. One web crawling technique to identify malicious sites is to detect malicious JS code thereon while browsing. As such, one anti-analysis technique used by attackers is JS obfuscation which is the deliberate act of making the JS code difficult to detect, without extensive analysis.

As attackers can easily and quickly put up new malicious sites, there is a need for an advanced, smart, accurate, and efficient web crawler to detect the new malicious sites even with the anti-analysis techniques used to avoid detection.

BRIEF SUMMARY OF THE DISCLOSURE

The present disclosure relates to web crawler systems and methods to efficiently detect malicious sites. Specifically, a web crawler is described for quick, efficient, and accurate identification of malicious web sites. Such identification may be used by network security systems including cloud-based security systems for blocking, flagging, blacklisting, and quarantining these web sites. The web crawler can be implemented as a computer-implemented method, as instructions stored in a non-transitory computer-readable medium for execution by a processor, by a server, and the like. Generally, the web crawler is input with a list of web sites, performs anonymous browsing to each of the web sites, and provides an output classifying each of the web sites as malicious or not. Aspects of the web crawler include pre-filtering of the input set, efficient operation supporting a large number of sites, anonymous browsing, automatic JS de-obfuscation and detection, techniques to detect malicious artifacts in Uniform Resource Locators (URLs), techniques for identifying suspicious content, signature-less detection of JS obfuscation, and the like. For example, the signature-less detection of JS obfuscation includes the ability to efficiently and quickly detect malicious JS based on a difference between the obfuscated and de-obfuscated JS content, namely whether there are new JS functions or domains present in the de-obfuscated JS content.

In an embodiment, a non-transitory computer-readable storage medium has computer-readable code stored thereon for programming a server to performs steps of receiving a list of web sites; anonymously browsing to each web site in the list; receiving a response based on the browsing; and analyzing the response to classify each web site as malicious or not based on a plurality of techniques including JavaScript (JS) obfuscation detection based on de-obfuscation. The computer-readable code stored can be further configured to program the server to perform the step of providing a blacklist of web sites classified as malicious. The JS obfuscation detection can be performed by de-obfuscating JS content and utilizing heuristics to determine if the de-obfuscated JS content is malicious. The heuristics can include a presence of any of a new JS function and a domain in the de-obfuscated JS content. The plurality of techniques can further include detection of hidden Inline Frames in the response. The computer-readable code stored can be further configured to program the server to perform the step of determining the list of web sites periodically based on a plurality of factors. The plurality of factors can include newly registered domains, suspicious domains flagged by heuristic signatures, unclassified domains in a network security system, country-specific domains, a targeted scan based on Content Management System (CMS). The anonymously browsing can utilize a Virtual Private Network (VPN) to obscure the server.

In another embodiment, a server includes a network interface communicatively coupled to a network; a processor communicatively coupled to the network interface; and memory storing computer-executable instructions that, when executed, cause the processor to receive a list of web sites; anonymously browse to each web site in the list; receive a response based on the browsing; and analyze the response to classify each web site as malicious or not based on a plurality of techniques including JavaScript (JS) detection obfuscation based on de-obfuscation. The JS obfuscation detection can be performed by de-obfuscating JS content and utilizing heuristics to determine if the de-obfuscated JS content is malicious, and the heuristics can include a presence of any of a new JS function and a domain in the de-obfuscated JS content.

In a further embodiment, a method includes receiving a list of web sites; anonymously browsing to each web site in the list; receiving a response based on the browsing; and analyzing the response to classify each web site as malicious or not based on a plurality of techniques including JavaScript (JS) obfuscation detection based on de-obfuscation. The method can further include providing a blacklist of web sites classified as malicious. The method can further include determining the list of web sites periodically based on a plurality of factors. The JS obfuscation detection can be performed by de-obfuscating JS content and utilizing heuristics to determine if the de-obfuscated JS content is malicious, and the heuristics can include a presence of any of a new JS function and a domain in the de-obfuscated JS content.

BRIEF DESCRIPTION OF THE DRAWINGS

The present disclosure is illustrated and described herein with reference to the various drawings, in which like reference numbers are used to denote like system components/method steps, as appropriate, and in which:

FIG. 2 is a block diagram of a server which may be used in the cloud-based system of FIG. 1 or the like;

FIG. 3 is a block diagram of a mobile device which may be used in the cloud-based system of FIG. 1 or the like;

FIG. 5 is a snapshot of a de-obfuscated Magecart phishing page; and

DETAILED DESCRIPTION OF THE DISCLOSURE

Again, the present disclosure relates to web crawler systems and methods to efficiently detect malicious sites. Specifically, a web crawler is described for quick, efficient, and accurate identification of malicious web sites. Such identification may be used by network security systems including cloud-based security systems for blocking, flagging, blacklisting, and quarantining these web sites. The web crawler can be implemented as a computer-implemented method, as instructions stored in a non-transitory computer-readable medium for execution by a processor, by a server, and the like. Generally, the web crawler is input with a list of web sites, performs anonymous browsing to each of the web sites, and provides an output classifying each of the web sites as malicious or not. Aspects of the web crawler include pre-filtering of the input set, efficient operation supporting a large number of sites, anonymous browsing, automatic JS de-obfuscation and detection, techniques to detect malicious artifacts in Uniform Resource Locators (URLs), techniques for identifying suspicious content, signature-less detection of JS obfuscation, and the like. For example, the signature-less detection of JS obfuscation includes the ability to efficiently and quickly detect malicious JS based on a difference between the obfuscated and de-obfuscated JS content, namely whether there are new JS functions or domains present in the de-obfuscated JS content.

Example Cloud System Architecture

Figure 1:
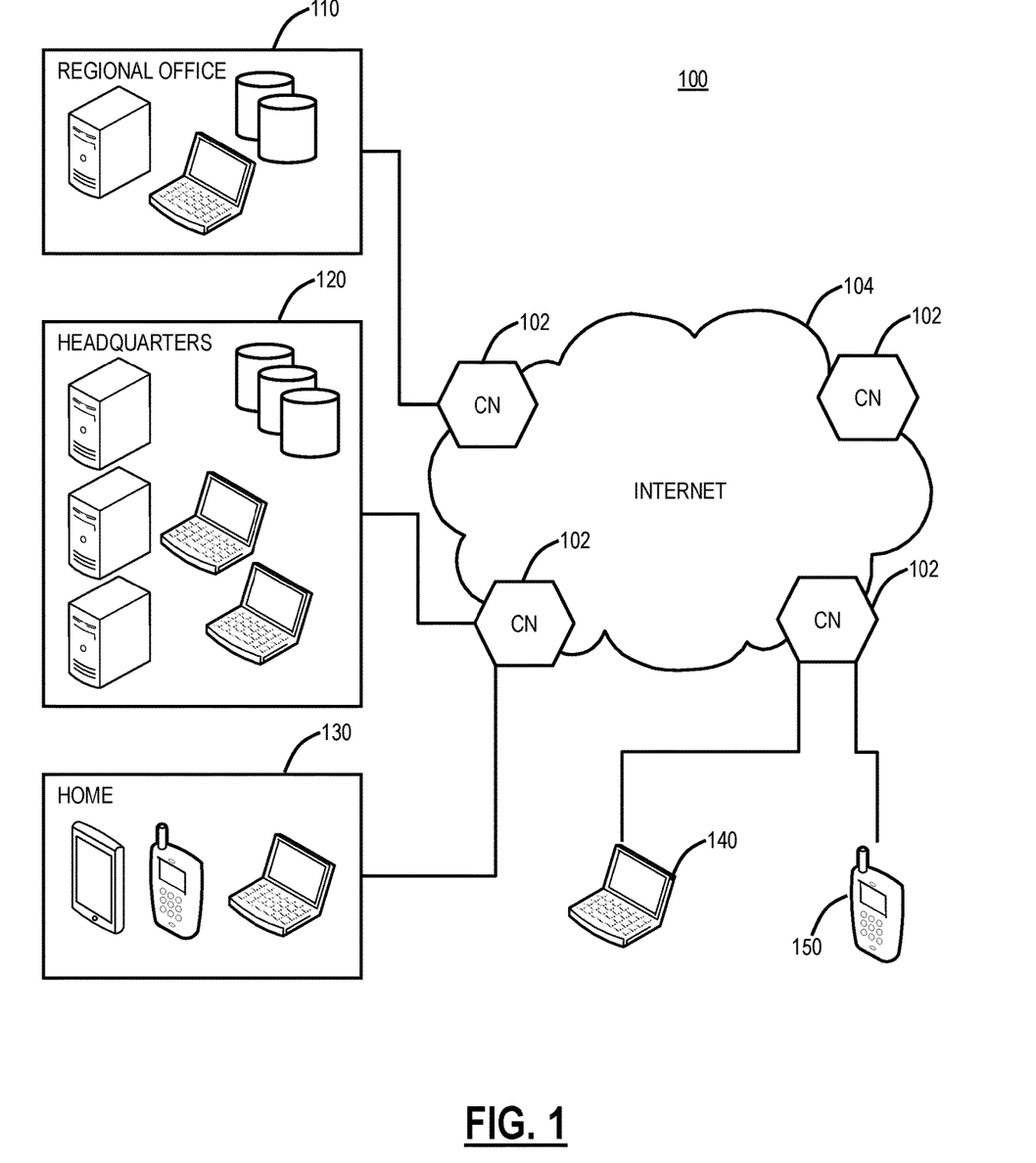
FIG. 1 is a network diagram of a cloud-based system for implementing various cloud-based service functions.
Figure 2:
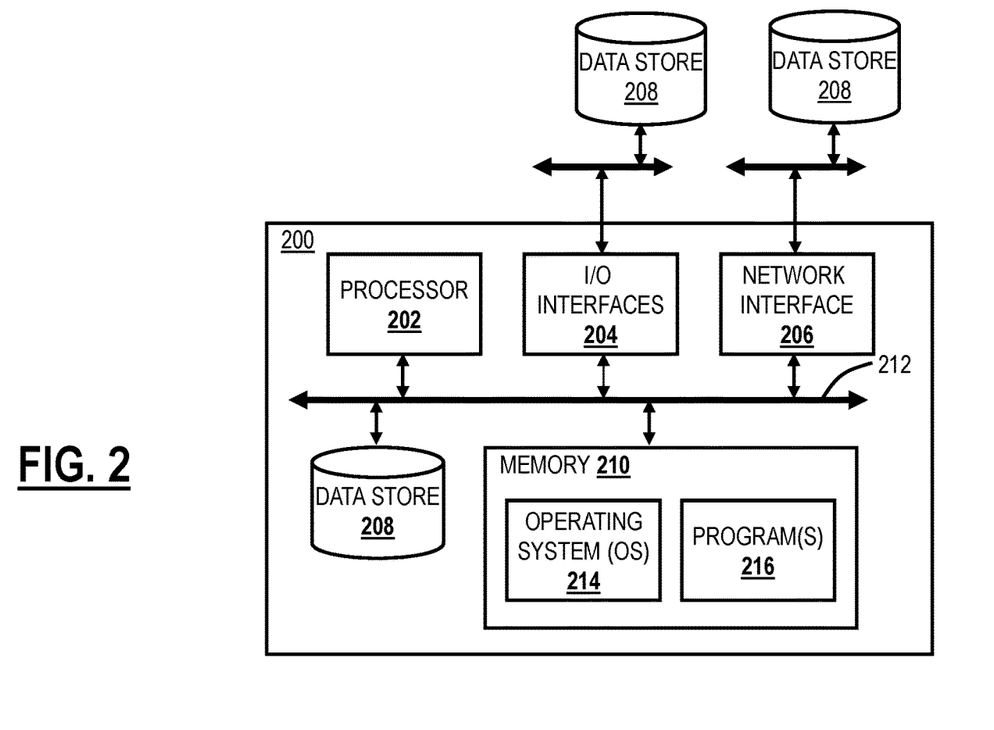

FIG. 1 is a network diagram of a cloud-based system 100 for implementing various cloud-based service functions. The cloud-based system 100 includes one or more cloud nodes (CN) 102 communicatively coupled to the Internet 104 or the like. The cloud nodes 102 may be implemented as a server 200 (as illustrated in FIG. 2), or the like, and can be geographically diverse from one another such as located at various data centers around the country or globe. For illustration purposes, the cloud-based system 100 can include a regional office 110, headquarters 120, various employee's homes 130, laptops/desktops 140, and mobile devices 150 each of which can be communicatively coupled to one of the cloud nodes 102. These locations 110, 120, 130 and devices 140, 150 are shown for illustrative purposes, and those skilled in the art will recognize there are various access scenarios to the cloud-based system 100 all of which are contemplated herein.

Again, the cloud-based system 100 can provide any functionality through services such as software as a service, platform as a service, infrastructure as a service, security as a service, Virtual Network Functions (VNFs) in a Network Functions Virtualization (NFV) Infrastructure (NFVI), etc. to the locations 110, 120, 130 and devices 140, 150. The cloud-based system 100 is replacing the conventional deployment model where network devices are physically managed and cabled together in sequence to deliver the various services associated with the network devices. The cloud-based system 100 can be used to implement these services in the cloud without end-users requiring the physical devices and management thereof. The cloud-based system 100 can provide services via VNFs (e.g., firewalls, Deep Packet Inspection (DPI), Network Address Translation (NAT), etc.). VNFs take the responsibility of handling specific network functions that run on one or more virtual machines (VMs), software containers, etc., on top of the hardware networking infrastructure—routers, switches, etc. Individual VNFs can be connected or combined together as building blocks in a service chain to offer a full-scale networking communication service. The cloud-based system 100 can provide other services in addition to VNFs, such as X-as-a-Service (XaaS) where X is security, access, etc.

Two example services include Zscaler Internet Access (ZIA) (which can generally be referred to as Internet Access (IA)) and Zscaler Private Access (ZPA) (which can generally be referred to as Private Access (PA)), from Zscaler, Inc. (the assignee and applicant of the present application). The IA service can include firewall, threat prevention, Deep Packet Inspection (DPI), Data Leakage Prevention (DLP), and the like. The PA can include access control, microservice segmentation, etc. For example, the IA service can provide a user with Internet Access and the PA service can provide a user with access to enterprise resources in lieu of traditional Virtual Private Networks (VPNs).

Cloud computing systems and methods abstract away physical servers, storage, networking, etc. and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. Centralization gives cloud service providers complete control over the versions of the browser-based and other applications provided to clients, which removes the need for version upgrades or license management on individual client computing devices. The phrase "software as a service" (SaaS) is sometimes used to describe application programs offered through cloud computing. A common shorthand for a provided cloud computing service (or even an aggregation of all existing cloud services) is "the cloud." The cloud-based system 100 is illustrated herein as one example embodiment of a cloud-based system, and those of ordinary skill in the art will recognize the systems and methods described herein contemplate operation with any cloud-based system.

In an embodiment, the cloud-based system 100 can be a distributed security system or the like. Here, in the cloud-based system 100, traffic from various locations (and various devices located therein) such as the regional office 110, the headquarters 120, various employee's homes 130, laptops/desktops 140, and mobile devices 150 can be monitored or redirected to the cloud through the cloud nodes 102. That is, each of the locations 110, 120, 130, 140, 150 is communicatively coupled to the Internet 104 and can be monitored by the cloud nodes 102. The cloud-based system 100 may be configured to perform various functions such as spam filtering, uniform resource locator (URL) filtering, antivirus protection, bandwidth control, DLP, zero-day vulnerability protection, web 2.0 features, and the like. In an embodiment, the cloud-based system 100 may be viewed as Security-as-a-Service through the cloud, such as the IA. For example, the cloud-based system 100 can be used to block or allow access to web sites and such access control can be based in part on the web crawler systems and methods described herein to identify malicious sites.

Figure 3:
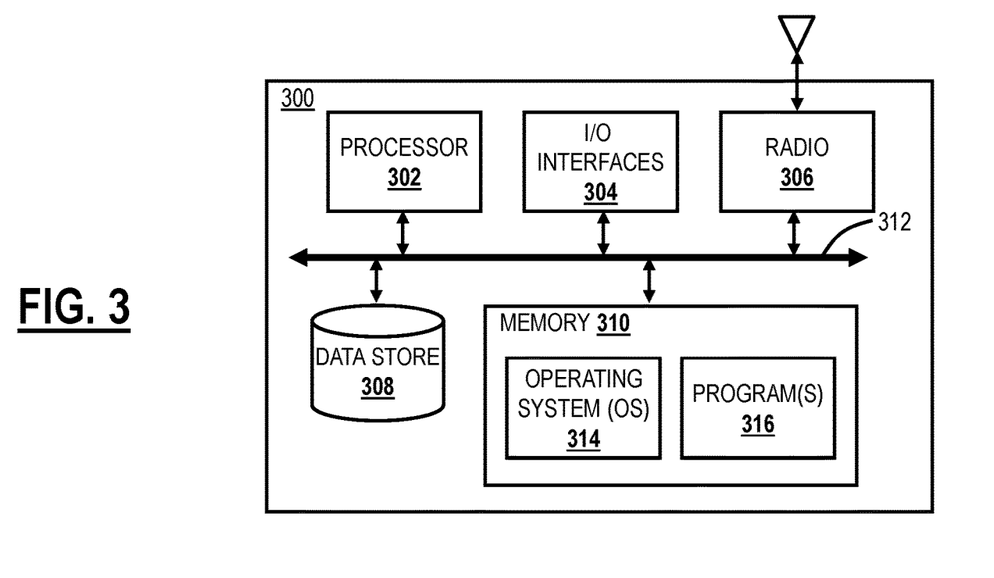

In an embodiment, the cloud-based system 100 can be configured to provide mobile device security and policy systems and methods. The mobile device 150 may be a mobile device 200 (as illustrated in FIG. 3) and may include common devices such as laptops, smartphones, tablets, netbooks, personal digital assistants, MP3 players, cell phones, e-book readers, and the like. The cloud-based system 100 is configured to provide security and policy enforcement for devices, including the mobile devices 150 in the cloud.

Advantageously, the cloud-based system 100, when operating as a distributed security system, avoids platform-specific security apps on the mobile devices 150, forwards web traffic through the cloud-based system 100, enables network administrators to define policies in the cloud, and enforces/cleans traffic in the cloud prior to delivery to the mobile devices 150. Further, through the cloud-based system 100, network administrators may define user-centric policies tied to users, not devices, with the policies being applied regardless of the device used by the user. The cloud-based system 100 provides 24×7 security with no need for updates as the cloud-based system 100 is always up-to-date with current threats and without requiring device signature updates. Also, the cloud-based system 100 enables multiple enforcement points, centralized provisioning, and logging, automatic traffic routing to the nearest cloud node 102, geographical distribution of the cloud nodes 102, policy shadowing of users which is dynamically available at the cloud nodes 102, etc.

Example Server Architecture

FIG. 2 is a block diagram of a server 200 which may be used in the cloud-based system 100, in other systems, or standalone. For example, the cloud nodes 102 may be formed as one or more of the servers 200. The server 200 may be a digital computer that, in terms of hardware architecture, generally includes a processor 202, Input/Output (I/O) interfaces 204, a network interface 206, a data store 208, and memory 210. It should be appreciated by those of ordinary skill in the art that FIG. 2 depicts the server 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a central processing unit (CPU), an auxiliary processor among several processors associated with the server 200, a semiconductor-based microprocessor (in the form of a microchip or chipset), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components.

The network interface 206 may be used to enable the server 200 to communicate on a network, such as the Internet 104. The network interface 206 may include, for example, an Ethernet card or adapter (e.g., 10BaseT, Fast Ethernet, Gigabit Ethernet, 10 GbE) or a Wireless Local Area Network (WLAN) card or adapter (e.g., 802.11a/b/g/n/ac). The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 may incorporate electronic, magnetic, optical, and/or other types of storage media. In one example, the data store 208 may be located internal to the server 200 such as, for example, an internal hard drive connected to the local interface 212 in the server 200. Additionally, in another embodiment, the data store 208 may be located external to the server 200 such as, for example, an external hard drive connected to the I/O interfaces 204 (e.g., SCSI or USB connection). In a further embodiment, the data store 208 may be connected to the server 200 through a network, such as, for example, a network-attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another, but can be accessed by the processor 202. The software in memory 210 may include one or more software programs, each of which includes an ordered listing of executable instructions for implementing logical functions. The software in the memory 210 includes a suitable Operating System (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

Example User Device Architecture

FIG. 3 is a block diagram of a user device 300, which may be used in the cloud-based system 100 or the like. Again, the user device 300 can be a smartphone, a tablet, a smartwatch, an Internet of Things (IoT) device, a laptop, etc. The user device 300 can be a digital device that, in terms of hardware architecture, generally includes a processor 302, Input/Output (I/O) interfaces 304, a radio 306, a data store 308, and memory 310. It should be appreciated by those of ordinary skill in the art that FIG. 3 depicts the user device 300 in an oversimplified manner, and a practical embodiment may include additional components and suitably configured processing logic to support known or conventional operating features that are not described in detail herein. The components (302, 304, 306, 308, and 302) are communicatively coupled via a local interface 312. The local interface 312 can be, for example, but not limited to, one or more buses or other wired or wireless connections, as is known in the art. The local interface 312 can have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 can be any custom made or commercially available processor, a central processing unit (CPU), an auxiliary processor among several processors associated with the user device 300, a semiconductor-based microprocessor (in the form of a microchip or chipset), or generally any device for executing software instructions. When the user device 300 is in operation, the processor 302 is configured to execute software stored within the memory 310, to communicate data to and from the memory 310, and to generally control operations of the user device 300 pursuant to the software instructions. In an embodiment, the processor 302 may include a mobile optimized processor such as optimized for power consumption and mobile applications. The I/O interfaces 304 can be used to receive user input from and/or for providing system output. User input can be provided via, for example, a keypad, a touch screen, a scroll ball, a scroll bar, buttons, barcode scanner, and the like. System output can be provided via a display device such as a Liquid Crystal Display (LCD), touch screen, and the like.

The radio 306 enables wireless communication to an external access device or network. Any number of suitable wireless data communication protocols, techniques, or methodologies can be supported by the radio 306, including any protocols for wireless communication. The data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media.

The memory 310 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 310 may incorporate electronic, magnetic, optical, and/or other types of storage media. Note that the memory 310 may have a distributed architecture, where various components are situated remotely from one another, but can be accessed by the processor 302. The software in memory 310 can include one or more software programs, each of which includes an ordered listing of executable instructions for implementing logical functions. In the example of FIG. 3, the software in the memory 310 includes a suitable Operating System (O/S) 314 and programs 316. The operating system 314 essentially controls the execution of other computer programs, and provides scheduling, input-output control, file and data management, memory management, and communication control and related services. The programs 316 may include various applications, add-ons, etc. configured to provide end user functionality with the user device 300. For example, example programs 316 may include, but not limited to, a web browser, social networking applications, streaming media applications, games, mapping and location applications, electronic mail applications, financial applications, and the like. In a typical example, the end-user typically uses one or more of the programs 316 along with a network such as the cloud-based system 100.

Web Crawler

Figure 4:
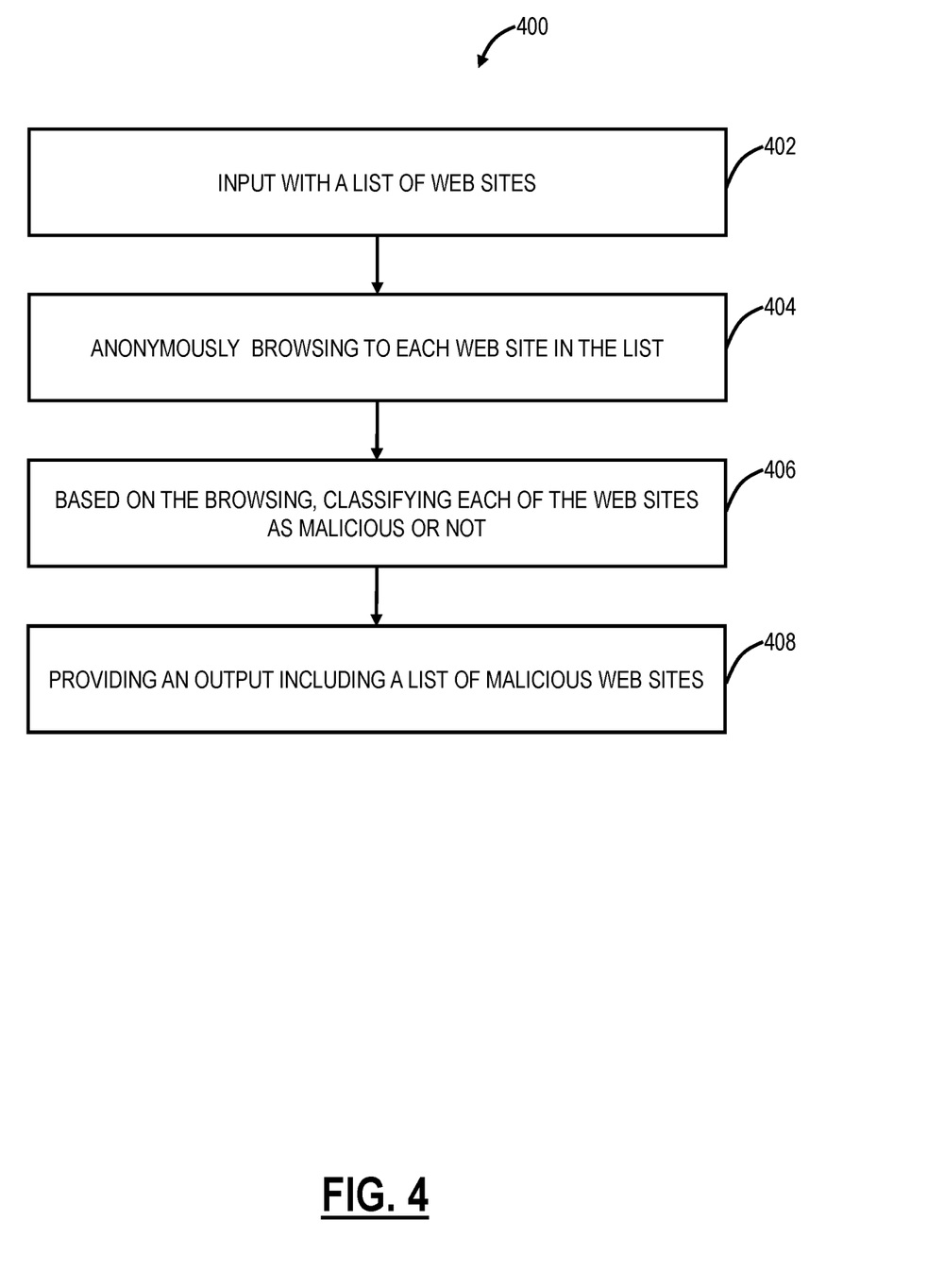
FIG. 4 is a flowchart of a web crawler process according to the present disclosure.

FIG. 4 is a flowchart of a web crawler process 400 according to the present disclosure. In an embodiment, the cloud node 102, the server 200, etc. can be configured to implement the web crawler process 400 and the various web crawler techniques described herein. The present disclosure includes various web crawler techniques which provide quick, efficient, and accurate identification of malicious web sites. Again, such identification may be used by the cloud-based system 100 for blocking, flagging, blacklisting, and quarantining these web sites. The objective of the web crawler techniques is to support a large number of web sites (scalability), to focus on the most relevant web sites (ones most likely to be malicious), to overcome anti-analysis techniques, and to quickly detect suspicious content. Again, aspects of the web crawler include pre-filtering of the input set, efficient operation supporting a large number of sites, anonymous browsing, automatic JS de-obfuscation and detection, techniques to detect malicious artifacts in Uniform Resource Locators (URLs), techniques for identifying suspicious content, signature-less detection of JS obfuscation, and the like. For example, signature-less detection of JS obfuscation is able to quickly detect JS obfuscation by performing a diff (difference) between the obfuscated and de-obfuscated JS. If there are any new JS functions or domains in the de-obfuscated content, which were not present in the obfuscated version, then the process 400 can determine JS obfuscation is present. This approach is quick and inefficient and does not require JS signatures for detection. That is, a signature-based detection scheme runs pattern matching for malicious anomalies on de-obfuscated/obfuscated content. The present disclosure utilizes a diff function to detect the presence of new functions or domains, and such presence is assumed to be malicious.

The process 400 includes receiving an input of a list of web sites (step 402). The input includes the web sites that require classification. A generic web crawler can crawl the top 1 M sites (such as based on a listing including Alexa). However, this approach is time consuming and requires a significant amount of time are resources. Further, the top sites are likely to not be suspicious. The input list can use a smart approach to leverage existing infrastructure to generate the inputs to crawl and find infections faster with less resource than the conventional crawling.

The input list can be selected based on any combination of newly registered domains, suspicious URLs flagged by heuristic signatures, unclassified URLs in a network security system, country-specific domains, targeted scan based on Content Management System (CMS), and the like. The newly registered domains can be obtained periodically through various approaches. Newly registered domains are more likely to be malicious as attackers typically set up new sites as one anti-analysis approach.

Suspicious URLs can be flagged by heuristic signatures in the cloud-based system 100. That is, an input to the process 400 can be based on ongoing monitoring in the cloud-based system 100 with the on-going monitoring utilizing signatures to identify suspicious URLs that should be crawled via the process 400.

A network security system or service can include an existing blacklist (and/or whitelist) and one approach can include crawling sites which are not already classified. Country specific domains can focus efforts on specific countries known for higher suspicious content. Finally, targeted scans can look at specific content, e.g. Drupal, WordPress, etc., based on vulnerabilities or mass compromise.

The process 400 includes anonymously browsing to each web site in the list (step 404). In an embodiment, the web crawling is anonymous, such as via a Virtual Private Network (VPN) service or the like, proxy, etc. that obscures the location of the device performing the crawling, i.e., obscuring the Internet Protocol (IP) address of the server 200 performing the process 400. This allows the process 400 to operate anonymously. In some embodiments, malicious sites can be configured to obscure their content from known web crawlers.

Based on the browsing, the process 400 includes classifying each of the web sites as malicious or not (step 406), and providing an output including a list of malicious web sites (step 408). The output of the process 400 can form the basis of a so-called blacklist, i.e., a list of malicious web sites. The blacklist can further be monitored to perform further processing, ageing to remove web sites that no longer exist or that no longer exhibit suspicious behavior, etc. That is, the blacklist is a living list that has entries added and removed continually. The blacklist may be used by the cloud-based system 100 to block/allow access to the web sites. Also, the blacklist may be distributed to user devices 300 for local blocking of access. Those skilled in the art will recognize various aspects are possible once web sites are detected as suspicious, and all such aspects are contemplated herein.

The browsing includes requesting (HTTP) a web site and receiving response data. The process 400 utilizes various approaches to classify whether a particular site is malicious (suspicious) or not. The various approaches can include automatic JS de-obfuscation and detection, techniques to detect malicious artifacts in URLs, techniques for identifying suspicious content, signature-less detection of JS obfuscation, and the like. Examples of the techniques for identifying suspicious content include hidden iframe injection, obfuscated malware redirection, suspicious JS obfuscation, etc.

JS Obfuscation

The process 400 includes heuristics for signature less detection of JS obfuscation. For example, FIG. 5 is a snapshot of a de-obfuscated Magecart phishing page. A Magecart phishing page is a targeted credit card skimming attack. Most conventional antiviruses, web crawlers, or Secure Web Gateways (SWG) will miss this infection. The process 400 is configured to de-obfuscate and examine the malicious script, to flag the infection in de-obfuscated contents. Various active phishing pages were detected with some of the following threat names: HTML.Phish.CIBCBank, HTML.Phish.Apple, HTMl.Phish.Amazon, HTML.Phish.WebMail, HTML.Phish.Linkedin, HTML.Phish.Instagram, and Phishing.Gen.

Coin Miners infections are on the rise ever since they were found in-the wild. Coin miner malware includes programs that generate Bitcoin, Monero, Ethereum, or other cryptocurrencies. Of course, users can run coin miners for their own benefit. However, attackers are using coin miner malware via JS obfuscation to use devices without the consent or knowledge of the user.

Figure 6:
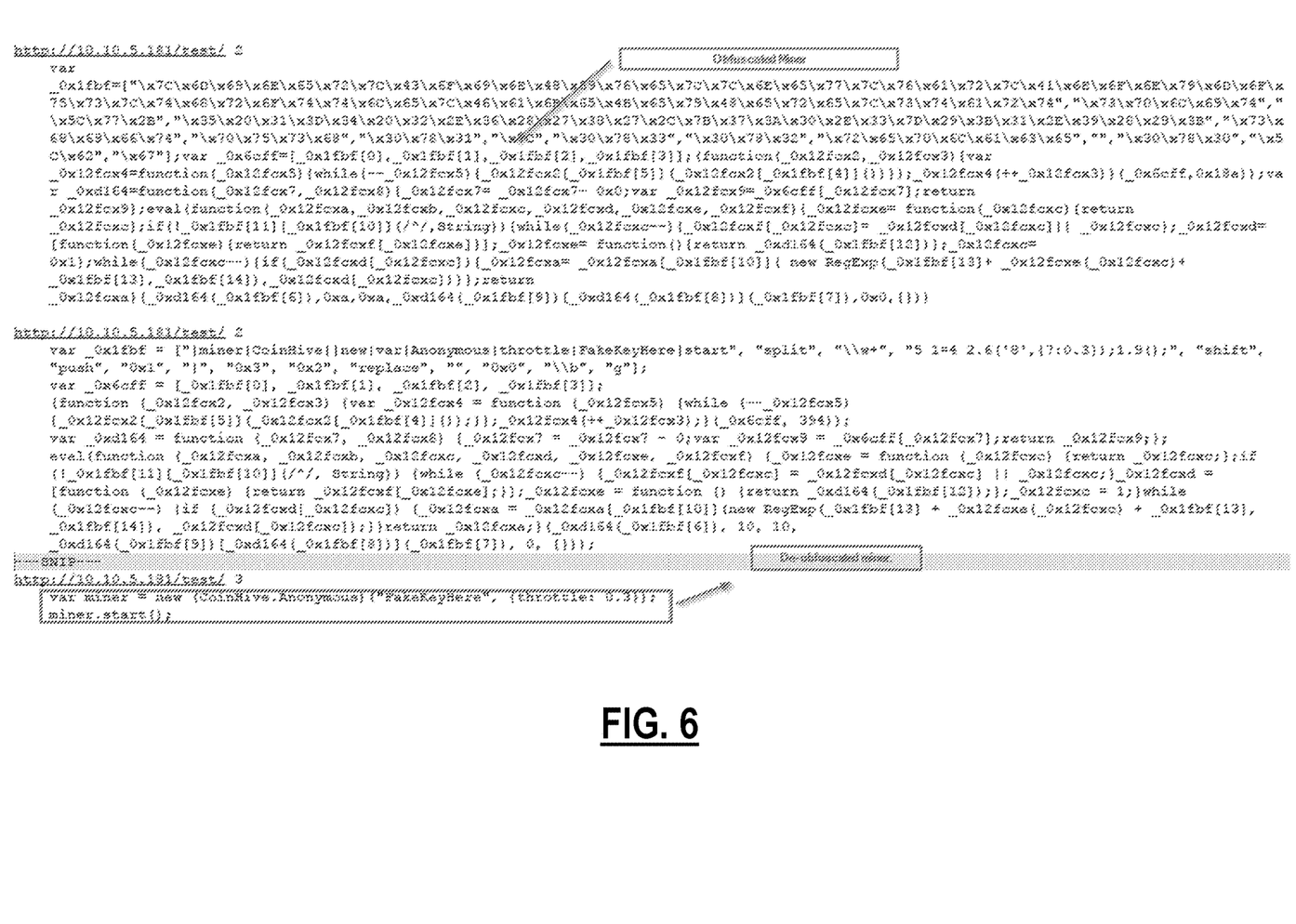
FIG. 6 is a snapshot of a successful detection of an in-the-wild obfuscated coin miner.

FIG. 6 is a snapshot of a successful detection of an in-the-wild obfuscated coin miner. Here, the process 400 detects the obfuscated miner, de-obfuscates the miner, and the mining keys are neutralized. Again, various active coin-mining infections have been defected with threat names such as JS.coinminer.jsecoin, JS.coinminer.gen. HTML.coinhive-.gen.

Again, a key aspect of the signature less detection of JS obfuscation is a difference between the obfuscated and de-obfuscated content. Any difference yielding new JS functions or domains in the de-obfuscated content is assumed to be malicious.

The following is an example of obfuscated JS:

[ ][(! [ ]+[ ])[+[ ]]+(![ [ ]]+[ ][[ ]])[+!+[ ]+[+[ ]]]+(! [ ]+
[ ])[!+[ ]+!+[ ]]+(! ![ ]+[ ])[+[ ]]+(!! [ ]+[ ])[!+[ ]+!+[ ]+!+
[ ]]+(!! [ ]+[ ])[+!+[ ]]][(! [ ]+[ ])[+[ ]]+(![ [ ]]+
[ ][[ ]])[+!+[ ]+[+[ ]]]+(! [ ]+[ ])[!+[ ]+!+[ ]]+(! ![ ]+[ ])[+
[ ]]+(! ![ ]+[ ])[!+[ ]+!+[ ]+!+[ ]]+(! ![ ]+[ ])[+!+[ ]])[!+
[ ]+!+[ ]+!+[ ]]+(! ![ ]+[(! [ ]+[ ])[+[ ]]+(![ [ ]]+
[ ][[ ]])[+!+[ ]+[+[ ]]]+(![ ]+[ ])[!+[ ]+!+[ ]]+(!++[ ]])[++
[ ]+[+[ ]]]+([ ][[ ]]+[ ])[+!+[ ]]+(![ ]+[ ])[!+[ ]+!+[ ]+!+
[ ]]+(!![ ]+[ ])[+[ ]]+(!![ ]+[ ][+!+[ ]]+(! ][[ ]]+[ ])[+[ ]]+
([ ][(! [ ]+[ ])[+[ ]]+(![ [ ]]+[ ][[ ]])[+!+[ ]+[+[ ]]]+(! [ ]+
[ ])[!+[ ]+!+[ ]]+(! ![ ]+[ . . . .

The de-obfuscated version of the above script is document.write("Phishing_Content"), which includes a new JS function.

The present disclosure looks for certain patterns, namely new JS functions or domains, in the de-obfuscated content with the presence of such indicative of malicious behavior.

Suspicious Redirection

It has also been observed some compromised web site have Inline Frames (Iframes) which are obfuscated. An IFrame (Inline Frame) is a Hypertext Markup Language (HTML) document embedded inside another HTML document on a website. The IFrame HTML element is often used to insert content from another source, such as an advertisement, into a Web page. The process 400 can include YARA signatures to detect hidden IFrames embedded in a crawled web site. Such detection can be used to classify a website as malicious.

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a Read-Only Memory (ROM), a Programmable Read-Only Memory (PROM), an Erasable Programmable Read-Only Memory (EPROM), an Electrically Erasable Programmable Read-Only Memory (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A non-transitory computer-readable storage medium having computer-readable code stored thereon for programming a server to performs steps of:
    receiving a list of web sites, wherein the list of web sites is created based on a plurality of factors, and wherein the factors include more than one of newly registered domains, suspicious domains flagged by heuristic signatures, unclassified domains in a network security system, country-specific domains, and a targeted scan based on Content Management System (CMS);
    anonymously browsing to each web site in the list;
    receiving a response based on the browsing;
    performing de-obfuscation of content in the response;
    analyzing the content by performing a difference between the de-obfuscated content and obfuscated content of the response to identify JS obfuscation in the content;
    classifying each web site as malicious or not based on a presence of any of a JS function and a domain in the de-obfuscated content not present in obfuscated content, wherein a web side is classified as malicious when the de-obfuscated content includes new functions or domains not present in the obfuscated content;
    providing a blacklist of web sites classified as malicious; and
    monitoring the blacklist to continually remove web sites that no longer exist or that no longer exhibit suspicious behavior.

2. The non-transitory computer-readable storage medium of claim 1, wherein the computer-readable code stored is further configured to program the server to perform the step of
    distributing the blacklist to a cloud-based system and user devices for local blocking of access at the user devices.

3. The non-transitory computer-readable storage medium of claim 1, wherein the classifying further includes detection of hidden Inline Frames in the response.

4. The non-transitory computer-readable storage medium of claim 1, wherein the computer-readable code stored is further configured to program the server to perform the step of
    creating the list of web sites periodically based on a plurality of factors.

5. The non-transitory computer-readable storage medium of claim 1, wherein the anonymously browsing utilizes a Virtual Private Network (VPN) to obscure the server.

6. The non-transitory computer-readable storage medium of claim 1, wherein the computer-readable code stored is further configured to program the server to perform steps of
    detecting an obfuscated coin miner in the content; and
    classifying the web site as malicious based on the detected obfuscated coin miner.

7. A server comprising:
    a network interface communicatively coupled to a network;
    a processor communicatively coupled to the network interface; and
    memory storing computer-executable instructions that, when executed, cause the processor to
        receive a list of web sites receiving a list of web sites, wherein the list of web sites is created based on a plurality of factors, and wherein the factors include more than one of newly registered domains, suspicious domains flagged by heuristic signatures, unclassified domains in a network security system, country-specific domains, and a targeted scan based on Content Management System (CMS);
        anonymously browse to each web site in the list;
        receive a response based on the browsing;
        perform de-obfuscation of content in the response;
        analyze the content by performing a difference between the de-obfuscated content and obfuscated content of the response to identify JS obfuscation in the content;
        classify each web site as malicious or not based on a presence of any of a JS function and a domain in the de-obfuscated content not present in obfuscated content, wherein a web site is classified as malicious when the de-obfuscated content includes new functions or domains not present in the obfuscated content;
        provide a blacklist of web sites classified as malicious; and
        monitor the blacklist to continually remove web sites that no longer exist or that no longer exhibit suspicious behavior.

8. The server of claim 7, wherein the computer-readable code stored is further configured to program the server to perform the step of distributing the blacklist to a cloud-based system and user devices for local blocking of access at the user devices.

9. The server of claim 7, wherein the classifying further includes detection of hidden Inline Frames in the response.

10. The server of claim 7, wherein the computer-executable instructions that, when executed, further cause the processor to
creating the list of web sites periodically based on a plurality of factors.

11. The server of claim 7, wherein the anonymously browsing utilizes a Virtual Private Network (VPN) to obscure the server.

12. A method comprising:
receiving a list of web sites, wherein the list of web sites is created based on a plurality of factors, and wherein the factors include more than one of newly registered domains, suspicious domains flagged by heuristic signatures, unclassified domains in a network security system, country-specific domains, and a targeted scan based on Content Management System (CMS);
anonymously browsing to each web site in the list;
receiving a response based on the browsing;
performing de-obfuscation of content in the response;
analyzing the content by performing a difference between the de-obfuscated content and obfuscated content of the response to identify JS obfuscation in the content;
classifying each web site as malicious or not based on a presence of any of a JS function and a domain in the de-obfuscated content not present in obfuscated content, wherein a web site is classified as malicious when the de-obfuscated content includes new functions or domains not presented in the obfuscated content;
providing a blacklist of web sites classified as malicious; and
monitoring the blacklist to continually remove web sites that no longer exist or that no longer exhibit suspicious behavior.

13. The method of claim 12, further comprising
distributing the blacklist to a cloud-based system and user devices for local blocking of access at the user devices.

14. The method of claim 12, further comprising
creating the list of web sites periodically based on a plurality of factors.

* * * * *